(12) United States Patent
Martin

(10) Patent No.: US 9,091,213 B2
(45) Date of Patent: Jul. 28, 2015

(54) PROCESSING BIOMASS

(75) Inventor: Alastair Douglas Martin, Cheshire (GB)

(73) Assignee: Keld Energy Limited, Cumbria (GB)

( * ) Notice: Subject to any disclaimer, the term of this patent is extended or adjusted under 35 U.S.C. 154(b) by 1348 days.

(21) Appl. No.: 12/519,497

(22) PCT Filed: Dec. 17, 2007

(86) PCT No.: PCT/GB2007/004851
§ 371 (c)(1),
(2), (4) Date: Jun. 16, 2009

(87) PCT Pub. No.: WO2008/075022
PCT Pub. Date: Jun. 26, 2008

(65) Prior Publication Data
US 2010/0071369 A1 Mar. 25, 2010

(30) Foreign Application Priority Data

Dec. 16, 2006 (GB) .................................. 0625156.5

(51) Int. Cl.
*F02C 6/18* (2006.01)
*F02C 3/28* (2006.01)
(Continued)

(52) U.S. Cl.
CPC . *F02C 3/28* (2013.01); *C10J 3/463* (2013.01); *C10J 3/84* (2013.01); *F02C 3/26* (2013.01);
(Continued)

(58) Field of Classification Search
CPC ................ F02C 3/28; F02C 3/22; F02C 3/26; F02C 3/20; F02C 3/205; F02C 7/08; F02C 7/10; Y02E 20/18

USPC .......................... 60/39.464, 39.511, 780, 781
See application file for complete search history.

(56) References Cited

U.S. PATENT DOCUMENTS 3,866,411 A * 2/1975 Marion et al. ................... 60/780
3,882,671 A * 5/1975 Nebgen ........................... 60/781
(Continued)

FOREIGN PATENT DOCUMENTS

AT 502147 1/2007
DE 3924908 A1 1/1991
(Continued)

OTHER PUBLICATIONS

International Search Report for Application No. PCT/GB2007/004851 dated Apr. 7, 2008.
(Continued)

*Primary Examiner* — Gerald L Sung
(74) *Attorney, Agent, or Firm* — Michael Best & Friedrich LLP

(57) ABSTRACT

Methods for the processing of biomass, particularly but not exclusively poultry litter, to generate energy. A method is presented for generating power from biomass comprising a gasification process involving the gasification of biomass to produce a combustible fuel gas and a power generation process involving combustion of the combustible fuel gas to produce a combustion exhaust gas which is fed to a power generator to generate power and a generator exhaust gas. Compressed air is placed in thermal contact with the generator exhaust gas to facilitate heat transfer between the compressed air and the generator exhaust gas. A first portion of compressed air that has thermally contacted the generator exhaust gas is fed to the gasification process to assist in gasification of further biomass.

10 Claims, 3 Drawing Sheets

(51) Int. Cl.
C10J 3/46 (2006.01)
C10J 3/84 (2006.01)
F02C 3/26 (2006.01)
F02C 7/224 (2006.01)

(52) U.S. Cl.
CPC . *F02C 6/18* (2013.01); *F02C 7/224* (2013.01); *C10J 2300/0903* (2013.01); *C10J 2300/095* (2013.01); *C10J 2300/0909* (2013.01); *C10J 2300/0916* (2013.01); *C10J 2300/0956* (2013.01); *C10J 2300/165* (2013.01); *C10J 2300/1671* (2013.01); *C10J 2300/1693* (2013.01); *C10J 2300/1869* (2013.01); *C10J 2300/1884* (2013.01); *Y02E 50/11* (2013.01); *Y02E 50/12* (2013.01)

(56) References Cited

U.S. PATENT DOCUMENTS

| | | | | |
|---|---|---|---|---|
| 3,971,211 | A * | 7/1976 | Wethe et al. | 60/39.181 |
| 4,019,314 | A * | 4/1977 | Springmann | 60/781 |
| 4,492,085 | A * | 1/1985 | Stahl et al. | 60/649 |
| 4,592,762 | A * | 6/1986 | Babu et al. | 48/197 R |
| 5,121,600 | A * | 6/1992 | Sanders et al. | 60/39.464 |
| 5,431,007 | A * | 7/1995 | Viscovich et al. | 60/775 |
| 5,440,871 | A * | 8/1995 | Dietz et al. | 60/781 |
| 5,666,801 | A * | 9/1997 | Rohrer | 60/781 |
| 5,666,890 | A * | 9/1997 | Craig | 110/229 |
| 5,771,677 | A * | 6/1998 | Rohrer | 60/783 |
| 6,148,602 | A * | 11/2000 | Demetri | 60/775 |
| 6,338,239 | B1 * | 1/2002 | Hirata et al. | 60/775 |
| 6,419,856 | B1 * | 7/2002 | Cirrito et al. | 252/373 |
| 6,453,846 | B2 | 9/2002 | Lloyd | |
| 6,862,877 | B1 * | 3/2005 | James | 60/39.464 |
| 6,923,004 | B2 * | 8/2005 | Chandran et al. | 60/781 |
| 2004/0079087 | A1 | 4/2004 | Chandran et al. | |
| 2007/0034171 | A1 * | 2/2007 | Griffin et al. | 122/479.1 |
| 2009/0113895 | A1 * | 5/2009 | Steele et al. | 60/780 |
| 2009/0229271 | A1 * | 9/2009 | De Ruyck et al. | 60/775 |
| 2012/0137700 | A1 * | 6/2012 | Werner et al. | 60/781 |
| 2012/0297775 | A1 * | 11/2012 | Prabhu | 60/682 |

FOREIGN PATENT DOCUMENTS

| | | |
|---|---|---|
| EP | 0654591 A1 | 5/1995 |
| EP | 0937694 | 8/1999 |
| EP | 1182248 | 2/2002 |
| GB | 1018519 | 1/1966 |
| GB | 2104097 | 3/1983 |
| GB | 2158841 | 11/1985 |
| GB | 2339576 | 2/2000 |
| JP | 3-149294 | 6/1991 |
| JP | 5-17786 | 1/1993 |
| JP | 9-299994 | 11/1997 |
| WO | 95/35439 | 12/1995 |
| WO | 01/12754 | 2/2001 |
| WO | 0175277 A1 | 10/2001 |
| WO | 03004404 A2 | 1/2003 |
| WO | 03/018199 | 3/2003 |
| WO | 2005/033022 | 4/2005 |
| WO | 2007/123776 | 11/2007 |

OTHER PUBLICATIONS

Written Opinion for Application No. PCT/GB2007/004851 dated Apr. 7, 2008.
GB0625156.5 Search Report from the United Kingdom Patent Office dated Jul. 2, 2007 (1 page).
GB0625156.5 Search Report from the United Kingdom Patent Office dated Nov. 8, 2007 (2 pages).
GB0724512.9 Search Report from the United Kingdom Patent Office dated Sep. 9, 2008 (2 pages).
Buffinga, G.J., et al., "Implementation and Demonstration of an Embedded Small-Scale Poultry Manure CHP Process", BTG Biomass Technology Group BV, The Netherlands, 2001.
Reardon, John, P., et al., "Demonstration of a Small Modular BioPower System Using Poultry Litter", DOE SBIR Phase-I Final Report, Community Power Corporation, Contract: DE-FG03-01ER83214, Feb. 25, 2001.

* cited by examiner

PROCESSING BIOMASS

CROSS-REFERENCE TO RELATED APPLICATIONS

This patent application is a national stage filing under 35 U.S.C. 371 of International Application No. PCT/GB2007/004851, filed Dec. 17, 2007, which claims foreign priority to Great Britain Patent Application No. 0625156.5, filed Dec. 16, 2006, the disclosures of which are incorporated by reference herein in their entireties. Priority to each application is hereby claimed.

The present invention relates to methods and apparatus for processing biomass, particularly but not exclusively poultry litter, to generate energy.

Environmental and economic concerns have lead to increasing pressure to find cheap, efficient and environmentally friendly methods to process biomass.

The term biomass is used to describe a wide variety of different organic materials derived from natural sources, including wood waste, forest and mill residues, agricultural crops and waste, and animal waste, such as animal litter which is a mixture of cellulosic bedding material and animal manure.

It has long been recognised that raw biomass can be burned and the heat produced during combustion used directly, e.g. for heating water or the interior of a building. Alternatively, the raw biomass can first be converted into a gaseous fuel which is then burned and used to drive a power generator.

A problem that has hindered the development of methods to process biomass is its relatively low calorific value compared to conventional fossil fuels. The processing of biomass therefore requires the development of methods which can derive energy from biomass at a sufficient level of efficiency to make the methods economically feasible. Additionally, satisfactory protocols have to be in place to deal with the common waste products of biomass combustion, carbon monoxide, carbon dioxide, nitrogen oxides ($NO_x$) and sulphurous oxides ($SO_x$) as well as carbon-rich ash. Furthermore, in systems which operate at relatively low temperatures tar deposits can build up within the processing apparatus which can reduce overall power generation efficiency and necessitates periodic dismantling and cleaning of the processing apparatus.

A particular biomass material which is available in relatively high levels is waste poultry litter produced by both egg laying and broiler chickens/turkeys. Increasingly stringent legislation is likely to lead to poultry farmers having to incur considerable expense to dispose of the litter in an acceptable manner. Aspects of the present invention relate to improved methods and apparatus for deriving energy from biomass, particularly but not exclusively poultry litter, in an efficient and environmentally friendly manner which is in accordance with current legislation.

European Patent Application Publication No. EP1182248A1 (BTG BV) describes a method for processing animal waste by gasifying dried animal manure, purifying the manure/gas mixture and then 'cracking' the purified gas mixture to yield a combustible fuel gas which is used to drive a conventional combustion engine. A significant disadvantage of this method is the requirement to cool the gasified manure from a gasification temperature of 873 to 1223 K to a temperature of between 303 and 353 K to enable the gasified manure to be passed to the combustion engine. The overall efficiency of this process is severely limited by the need to first heat the manure to a sufficiently high temperature to form the gasified mixture followed by then having to significantly reduce the temperature of the gasified mixture to enable it to be passed to the combustion engine. The BTG BV process is described and analyzed in more detail in Comparative Example 1 below.

International Patent Application Publication No. WO95/35439 (Cratech, Inc.) describes a biomass processing system which employs gasification in a similar manner to the BTG BV system described above but uses a different power generator. In the Cratech, Inc. system the combustion engine is replaced with a gas turbine which removes the requirement to significantly cool the gasified manure mixture before feeding it to the power generator. In this way, power generation efficiency is increased and tar build up is reduced thereby avoiding the costly process of dismantling and cleaning the processing apparatus. While the Cratech, Inc. system represents an improvement over the BTG BV system, the Cratech, Inc. system still generates energy at an ideal efficiency of only approximately 30% and so it would be desirable to develop a new and improved biomass processing system which operates with still greater efficiency. The Cratech, Inc. process is described and analyzed in more detail in Comparative Example 2 below.

An object of the present invention is to obviate, or mitigate one or more of the problems described above.

According to a first aspect of the present invention there is provided a method for generating power from biomass comprising a gasification process involving the gasification of biomass to produce a combustible fuel gas and a power generation process involving combustion of said combustible fuel gas to produce a combustion exhaust gas which is fed to a power generator to generate power and a generator exhaust gas, wherein the method further comprises placing compressed air in thermal contact with said generator exhaust gas to facilitate heat transfer between said compressed air and said generator exhaust gas, and feeding a first portion of compressed air that has thermally contacted the generator exhaust gas to the gasification process to assist in gasification of further biomass.

According to a second aspect of the present invention there is provided apparatus for generating power from biomass comprising a gasification unit in which biomass is gasified to produce a combustible fuel gas, a power generation unit in which said combustible fuel gas is combusted to produce a combustion exhaust gas which is fed to a power generator to generate power and a generator exhaust gas, and a heat interchanger interposed between said gasification unit and said power generation unit, wherein the apparatus is operable to feed compressed air from a compressed air source to the heat interchanger and to feed the generator exhaust gas from the power generator to the heat interchanger, the heat interchanger being arranged to bring into thermal contact the compressed air and the generator exhaust gas to facilitate heat transfer between said compressed air and said generator exhaust gas, and further wherein the apparatus is operable to feed to the gasification unit a first portion of compressed air that has thermally contacted the generator exhaust gas to assist in gasification of further biomass.

The present invention provides an integrated system for the generation of power from biomass, particularly poultry litter. Mass and energy balance calculations described below in the Examples demonstrate that the system of the present invention can generate power at a higher level of efficiency than prior art systems. While the system of the present invention can be used on any desirable scale, it will be evident to the skilled person that the system according to the present invention is eminently suitable for relatively small farm-scale use, which will provide significant financial and environmental benefits. The local economic environment is likely to dictate the commercial viability of the system of the present invention in a particular situation. While the system may find application up to any desirable electrical output level, it is envisaged that above approximately 50 MW electrical output it is less likely that the system of the present invention will remain competitive with other technologies. Above approximately 10 MW electrical output economies of scale make it practical to consider the introduction of a boiler and steam turbine with all of the associated equipment and manning requirements which are well known to persons skilled in this technical area. This additional complexity obviously comes at additional cost but generally delivers higher efficiency than less complex power generation systems. It is envisaged that the system of the present invention is eminently suitable for generating an electrical output of up to at least around 10 MW, more preferably up to around 5 MW. Between about 2 and 10 MW electrical output with increasing power, a wider range of gas turbines becomes available with higher expander inlet temperature constraints and higher compression ratios, which may generate alternative opportunities for energy integration without the introduction of additional process fluids. The system of the present invention is particularly applicable up to the scale of around 2 MW electrical output, and more preferably up to around 1 MW electrical output.

As stated above, the method and apparatus of the first and second aspects of the present invention respectively comprises placing compressed air in thermal contact with said generator exhaust gas to facilitate heat transfer between said compressed air and said generator exhaust gas. In certain preferred embodiments, the compressed air is placed in thermal contact with the generator exhaust gas to facilitate indirect contact heat transfer between the compressed air and the generator exhaust gas. By integrating the heat interchanger with the gasification unit a portion of compressed air exiting the heat interchanger can be fed to the gasification unit to assist in gasifying and cracking the litter/air mixture. By suitably arranging the system, the compressed air fed from the heat interchanger to the gasification unit can be significantly hotter than compressed air that is typically fed to prior art gasification processes which reduces the mass of litter within the gasifier that must be burned to generate sufficient thermal energy to drive the gasification/cracking process and thereby improves the overall power generation efficiency of the process.

A third aspect of the present invention provides a method for generating power from biomass comprising a gasification process involving the gasification of biomass to produce a combustible fuel gas and a power generation process involving combustion of said combustible fuel gas to produce a combustion exhaust gas which is fed to a power generator to generate power and a generator exhaust gas, wherein the method further comprises placing said generator exhaust gas in thermal contact with the combustible fuel gas to facilitate indirect contact heat transfer between said generator exhaust gas and said combustible fuel gas.

A fourth aspect of the present invention provides apparatus for generating power from biomass comprising a gasification unit in which biomass is gasified to produce a combustible fuel gas, a power generation unit in which said combustible fuel gas is combusted to produce a combustion exhaust gas which is fed to a power generator to generate power and a generator exhaust gas, and a heat interchanger interposed between said gasification unit and said power generation unit, wherein the heat interchanger is arranged to bring into thermal contact the generator exhaust gas and the combustible fuel gas to facilitate indirect contact heat transfer between said generator exhaust gas and said combustible fuel gas.

Integration of the output of the power generator with the heat interchanger in this way enables heat to be exchanged as desired between the generator exhaust gas and the combustible fuel gas prior to combustion. It will be appreciated that it may be advantageous to arrange the system according to the present invention such that the generator exhaust gas is hotter, preferably significantly hotter, than the combustible fuel gas to encourage heat to be transferred from the hotter generator exhaust gas to the cooler combustible fuel gas to reduce the amount of additional heating required to bring the combustible fuel gas up to the appropriate temperature for combustion, thereby improving the overall efficiency of the power generation process.

It will be appreciated that heat transfer between a relatively hot fluid (e.g. the generator exhaust gas of the present invention) and a relatively cold fluid (e.g. the combustible fuel gas of the present invention) can occur in one of three ways. First, direct contact heat transfer wherein the hot and cold fluids are placed in physical contact. Where the two fluids are either a gas and a liquid or two immiscible liquids heat transfer occurs across the free surface between the two fluids. Second, indirect contact heat transfer, as employed in the third and fourth aspects of the present invention and certain preferred embodiments of the first and second aspects of the present invention, in which the hot and cold fluids are placed in thermal contact but not physical contact. The heat transfer occurs across a thermally conducting barrier between the hot and cold fluids. The barrier is typically a solid wall or partition between the hot and cold fluids. Third, indirect heat transfer, where the hot and cold fluids are placed in thermal contact but not physical contact and the heat transfer occurs through an interposed heat transfer fluid. It will be understood that the heat transfer between the hot fluid and the heat transfer fluid may be either by direct or indirect contact, and that the heat transfer between the heat transfer fluid and the cold fluid may occur by either direct or indirect means. On manufacturing facilities heat transfer fluids are commonly referred to by the term "utilities", the two most common heat transfer fluids being steam and water.

Gasification, as employed in each of the above-defined aspects of the present invention, is one of four thermo-chemical processes; combustion, pyrolysis and reforming being the other three. The latter three may be viewed as occupying the corners of a triangle whilst gasification, which is quite different in many respects, occupies the area enclosed within the triangle.

Combustion is a thermo-chemical process in which oxygen and carbon sources are brought together at high temperature to effect a chemical reaction, the principal products of which are carbon-dioxide and water. The proportions of oxygen and carbon sources are chosen so as to achieve complete oxidation with the release of considerable exotherm.

Pyrolysis is a thermo-chemical process in which carbon sources alone are raised to a high temperature to effect physio-chemical reactions, the principal products of which are a "heavy" vapour containing complex hydrocarbons and oxy-hydrocarbons, and a solid char comprising principally elemental carbon. The reactions are normally accompanied by a significant endotherm. The endotherm is satisfied either through direct contact with a hot inert gas such as nitrogen or through indirect contact in a surface heat exchanger or a combination of the two.

Reforming is a thermo-chemical process in which water and carbon sources are brought together at high temperature to effect a chemical reaction, the principal products of which are hydrogen, carbon-monoxide and carbon-dioxide. The proportions of water and carbon sources are chosen so as to achieve complete volatilization of the carbon sources. The reaction is normally accompanied by a considerable endotherm. The endotherm is satisfied either through direct contact with hot excess steam or through indirect contact in a surface heat exchanger or a combination of the two.

Gasification is a thermo-chemical process in which oxygen, water and carbon sources (reactants) are brought together at high temperature to effect a chemical reaction, the principal products of which are hydrogen, carbon-monoxide and carbon-dioxide. The proportions of oxygen, water and carbon sources are chosen so as to achieve a satisfactory thermo-chemical balance between them and the principal products, the ultimate objective being to achieve an exact thermo-chemical balance between the reactants and products so that there is zero residual exo- or endo-therm, which represents an important difference between the gasification process and the three other processes described above. This condition is normally achieved when the oxygen supplied is less than the stoichiometric requirement for complete oxidation. For certain carbon sources it is possible to manipulate the hydrogen:carbon-monoxide ratio in the product gas by introducing carbon-dioxide as a constituent of the carbon sources whilst maintaining a satisfactory thermo-chemical balance. Where the carbon source is "biomass", principally comprised of carbohydrates such as sugar, starch and cellulose, all of the stoichiometric water requirement may be introduced in chemically bound form with the carbon sources. It will be evident to the skilled person that the requirements for successful gasification are different in many respects to those for the other three thermo-chemical processes mentioned above. It therefore follows that technology developed for application in any one of the four thermo-chemical processes is by no means directly transferable to any one of the other three processes.

The air induced into the power generation process of the present invention as a whole provides the stoichiometric combustion air for the fuel (e.g. poultry litter) and a proportionate excess to ensure combustion is complete. After the induced air has been compressed and thermally contacted by the generator exhaust gas (which preferably pre-heats the air provided the generator exhaust gas is hotter than the air) the air is preferably divided into a first portion, as specified above in respect of the first and second aspects of the present invention, and one or more further portions. The first portion is passed to the gasification process whilst the second portion may be passed directly to the combustion stage of the power generation process (e.g. a burner of a gas turbine).

Splitting of the induced air into the first, second and, if convenient, one or more further portions is determined by fuel and machine constraints. It will be appreciated that if none of the induced air is recirculated to the gasification process (i.e. the first portion is zero) then the gasifier becomes a pyroliser, and if the first portion is greater than or equal to the stoichiometric combustion requirement of the particular fuel (e.g. poultry litter) then the process that is occurring in the gasifier becomes combustion, neither of which situations are intended to be encompassed by the scope of the present invention, which relates to a gasification process as defined above. Rather, the first portion of air comprises a fraction of the induced air that is sufficient to convert a volatile part of the fuel (e.g. the poultry litter) into the gas phase but is insufficient to satisfy the stoichiometric combustion air requirement of the fuel. As will be appreciated by the skilled person, the stoichiometric combustion air requirement for the fuel is that mass of air required to convert the fuel to its oxides at standard conditions.

It is desirable to minimise the size and maximise the temperature of the first portion of the induced air for any given set of power generation process parameters (e.g. using a particular? gas turbine) or fuel constraints. By way of example, a higher expander inlet temperature constraint permits the use of a larger first portion of the induced air to be fed to the gasification process and a wetter fuel (e.g. poultry litter) may necessitate a larger first portion.

It is preferred that the first portion of the compressed air is around 5 to 95% of the total amount of compressed air, more preferably around 10 to 90%. The balance or remainder of the compressed air that is other than the first portion (i.e. the second portion) is preferably passed to the combustion process. In the absence of constraints imposed by the specific power generation process (e.g. the gas turbine) employed in a particular application and/or the use of very wet fuel (e.g. poultry litter) it is desirable that the first portion is up to around 90% of the total amount of induced compressed air. From a process perspective, as mentioned above, it is preferred that the fraction of the induced compressed air representing the first portion is as low as possible, preferably less than around half of the induced compressed air, more preferably less than around 30 to 35%, and most preferably less than around 15% of the induced compressed air.

Preferably the compressed air is split into just two portions, that is, just first and second portions, in which case it is preferred that the compressed air is split into a ratio of first and second portions of around 5:95 to 95:5 (first portion: second portion). More preferably said ratio is around 15:85 to 85:15, still more preferably around 35:65 to 65:35. It is particularly preferred that the compressed air is split such that the second portion is larger, preferably significantly larger than the first portion. A particularly preferred ratio for the first portion compared to the second portion is around 5:95 to around 35:65 (first portion:second portion), and most preferably around 5:95 to around 15:85.

Preferably the first portion of compressed air has a temperature of at least around 600 K, more preferably a temperature of at least around 800 K. The first portion of compressed air may have a temperature in the range around 800 to 1200 K, or more preferably in the range around 850 to 1100 K, or still more preferably in the range around 875 to 1000 K. Most preferably the first portion of compressed air has a temperature of around 890 K.

Based on standard thermodynamic principles it will be appreciated that the first portion of compressed air should preferably have the highest possible pressure permitted by the practical limitations of the system. In a preferred embodiment the first portion of compressed air preferably has a pressure of at least around 4 bara, more preferably a pressure of at least around 5 bara. The first portion of compressed air may have a pressure in the range 4 to 7 bara, more preferably the first portion of compressed air has a pressure in the range 5 to 6 bara. In certain preferred applications the first portion of compressed air has a pressure of around 5.75 bara.

With regard to the first and second aspects of the present invention it is preferred that a second portion of compressed air that has thermally contacted the generator exhaust gas is used to assist combustion of said combustible fuel gas. This is preferably achieved by the apparatus forming the second aspect of the present invention being operable to feed said second portion of compressed air that has thermally contacted the generator exhaust gas from the heat interchanger to the power generation unit to assist combustion of said combustible fuel gas.

This is advantageous since it enables the temperature of the second portion of compressed air fed to the combustion process to be optimised. For example, it is preferred that the generator exhaust gas heats the compressed air so that the second portion of compressed air fed to the combustion processes is warmer than if it had not contacted the warmer generator exhaust gas and so the amount of additional heating required during combustion of the process is reduced.

Preferably the second portion of compressed air has a temperature of at least around 600 K, more preferably at least around 800 K. It is preferred that the second portion of compressed air has a temperature in the range around 800 to 1200 K, more preferably in the range around 850 to 1100 K and most preferably in the range around 875 to 1000 K. The second portion of compressed air may have a temperature of around 890 K.

The skilled person will appreciate that standard thermodynamic principles dictate that the second portion of compressed air should preferably have the highest possible pressure subject to the practical constraints of the system. It is preferred that the second portion of compressed air has a pressure of at least around 4 bara, more preferably at least around 5 bara. In preferred embodiments the second portion of compressed air has a pressure in the range 4 to 7 bara, or more preferably in the range 5 to 6 bara. Most preferably the second portion of compressed air has a pressure of around 5.75 bara.

In a preferred embodiment of the first and second aspects of the present invention the compressed air placed in thermal contact with the generator exhaust gas has a lower temperature than the generator exhaust gas to facilitate heat transfer from the generator exhaust gas to the compressed air.

Preferably the generator exhaust gas has a temperature of at least around 800 K, more preferably a temperature of at least around 1000 K. The generator exhaust gas may have a temperature in the range 800 to 1200 K, or in the range 900 to 1100 K. It is particularly preferred that the generator exhaust gas has a temperature of around 1000 K.

The compressed air, before being placed in thermal contact with the generator exhaust gas, may have a temperature of less than around 600 K, or more preferably a temperature of less than around 500 K. Conveniently, the compressed air, before being placed in thermal contact with the generator exhaust gas, may have a temperature in the range 300 to 600 K, or in the range 400 to 500 K. Preferably the compressed air, before being placed in thermal contact with the generator exhaust gas, has a temperature of around 490 K.

In preferred embodiments of the first and second aspects of the present invention the generator exhaust gas is placed in thermal contact with further combustible fuel gas to facilitate heat transfer, preferably indirect contact heat transfer, between said generator exhaust gas and said further combustible fuel gas. This is preferably achieved by arranging the heat interchanger to bring into thermal contact the generator exhaust gas and further combustible fuel gas to facilitate heat transfer, preferably indirect contact heat transfer, between said generator exhaust gas and said further combustible fuel gas.

In this way, heat can be exchanged as desired between the generator exhaust gas and the combustible fuel gas prior to combustion. It may be advantageous to arrange the system such that the generator exhaust gas is hotter than the combustible fuel gas to encourage heat to be transferred from the hotter generator exhaust gas to the cooler combustible fuel gas to reduce the amount of additional heating required to bring the combustible fuel gas up to the appropriate temperature for combustion, thereby improving the overall efficiency of the power generation process.

The generator exhaust gas may have a temperature that is at least similar to, more preferably higher than, said combustible fuel gas prior to said combustible fuel gas being placed in thermal contact with said generator exhaust gas.

Where the generator exhaust gas is hotter than the combustible fuel gas heat will be transferred from said generator exhaust gas to said combustible fuel gas.

Preferably the combustible fuel gas, before being placed in thermal contact with the generator exhaust gas, has a temperature in the range 600 to 1200 K, more preferably a temperature in the range 800 to 1000 K. The combustible fuel gas, before being placed in thermal contact with the generator exhaust gas, may have a temperature of around 1000 K. Most preferably the combustible fuel gas, before being placed in thermal contact with the generator exhaust gas, may have a temperature of less than about 100 K.

In preferred embodiments of the first, second, third and fourth aspects of the present invention the combustion exhaust gas has a temperature of at least around 1200 K, more preferably a temperature of at least around 1400 K. It is preferred that the combustion exhaust gas has a temperature of in the range around 1200 to 1600 K, or more preferably a temperature in the range around 1300 to 1500 K. The combustion exhaust may have a temperature of around 1475 K.

The gasification of biomass which forms a part of all four aspects of the present invention may employ a temperature in the range around 600 to 2000 K, more preferably around 600 to 1200 K, still more preferably around 700 to 1000 K, and yet more preferably in the range around 750 to 900 K. Most preferably the gasification of biomass employs a temperature of around 800 K.

The gasification of biomass preferably employs a fluidised bed gasification process. The apparatus thus preferably comprises a fluidised bed gasification unit.

Said gasification of biomass preferably employs a catalyst to catalyse the gasification process. Thus, preferably said gasification unit incorporates a catalyst to catalyse the gasification process.

In a preferred embodiment of the above four aspects of the present invention ventilation air from a housing, such as a barn housing chickens or some other form of poultry, is placed in thermal contact with the generator exhaust gas to facilitate heat transfer between the ventilation air and the generator exhaust gas. It is therefore preferred that the apparatus according to the second and fourth aspects of the present invention comprises a further heat interchanger (which may or may not be physically incorporated with the previously mentioned heat interchanger), and said apparatus is operable to feed ventilation air from said housing to said further heat interchanger to place said ventilation air into thermal contact with said generator exhaust gas fed to said further heat interchanger to facilitate heat transfer between said ventilation air and said generator exhaust gas. Preferably the ventilation air, after being placed in thermal contact with said generator exhaust gas, is fed back to the housing and so it is preferable that the apparatus is operable to feed the ventilation air, after being placed in thermal contact with said generator exhaust gas, back to said housing.

Preferably the ventilation air, before being placed in thermal contact with said generator exhaust gas, is cooler than said generator exhaust gas to facilitate heat transfer from said generator exhaust gas to said ventilation air. This enables useful heat energy present in the generator exhaust gas to be used to heat the ventilation air.

It is preferred that the combustible fuel gas is filtered prior to undergoing combustion. The apparatus thus preferably comprises a fuel filter and the apparatus is operable to feed the combustible fuel gas through said filter prior to said combustible fuel gas undergoing combustion. It is particularly preferred that the combustible fuel gas is filtered prior to being placed in thermal contact with said generator exhaust gas and so preferably the fuel filter is located between the gasification unit and the heat interchanger.

The generator exhaust gas is preferably chemically treated to remove undesirable (e.g. environmentally harmful) compounds prior to release of said generator exhaust gas to the atmosphere. The apparatus preferably further comprises a chemical treatment unit arranged to chemically treat said generator exhaust gas to remove undesirable compounds prior to release of said generator exhaust gas to the atmosphere. Said undesirable compounds may be nitrogen oxide compounds, which may be converted to less harmful nitrogen ($N_2$) and carbon dioxide ($CO_2$).

A portion of said combustible fuel gas may be used during chemical treatment of said generator exhaust gas. Thus the apparatus may be operable to feed a portion of said combustible fuel gas to said chemical treatment unit such that said portion of combustible fuel gas can be used during chemical treatment of said generator exhaust gas.

The power generator preferably comprises a compressor and said compressor is used to produce the compressed air that is fed to the heat interchanger.

While any appropriate power generator may be used, it is preferred that said power generator is a gas turbine.

The methods and apparatus forming the various aspects of the present invention may be used to process any desirable form of biomass, but it will be appreciated that the various aspects of the present invention herein described are eminently suitable for processing poultry litter, particularly broiler chicken litter, to generate heat and power.

BRIEF DESCRIPTION OF THE DRAWINGS

Embodiments of the present invention will now be described, by way of example only, with reference to the accompanying drawings in which.

EXAMPLES

The biomass processing methods described in European patent application publication no. WO95/35439 (BTG BV) and International patent application publication no. WO95/35439 (Cratech, Inc.) are described and analyzed using thermodynamic modelling in Comparative Examples 1 and 2 respectively to determine the overall ideal power generation efficiency of each process. A method for generating power according to a preferred exemplary embodiment of an aspect of the present invention is described and analyzed in Example 1 for comparison to the results obtained for the two prior art methods investigated in Comparative Examples 1 and 2.

Comparative Example 1

Figure 1:
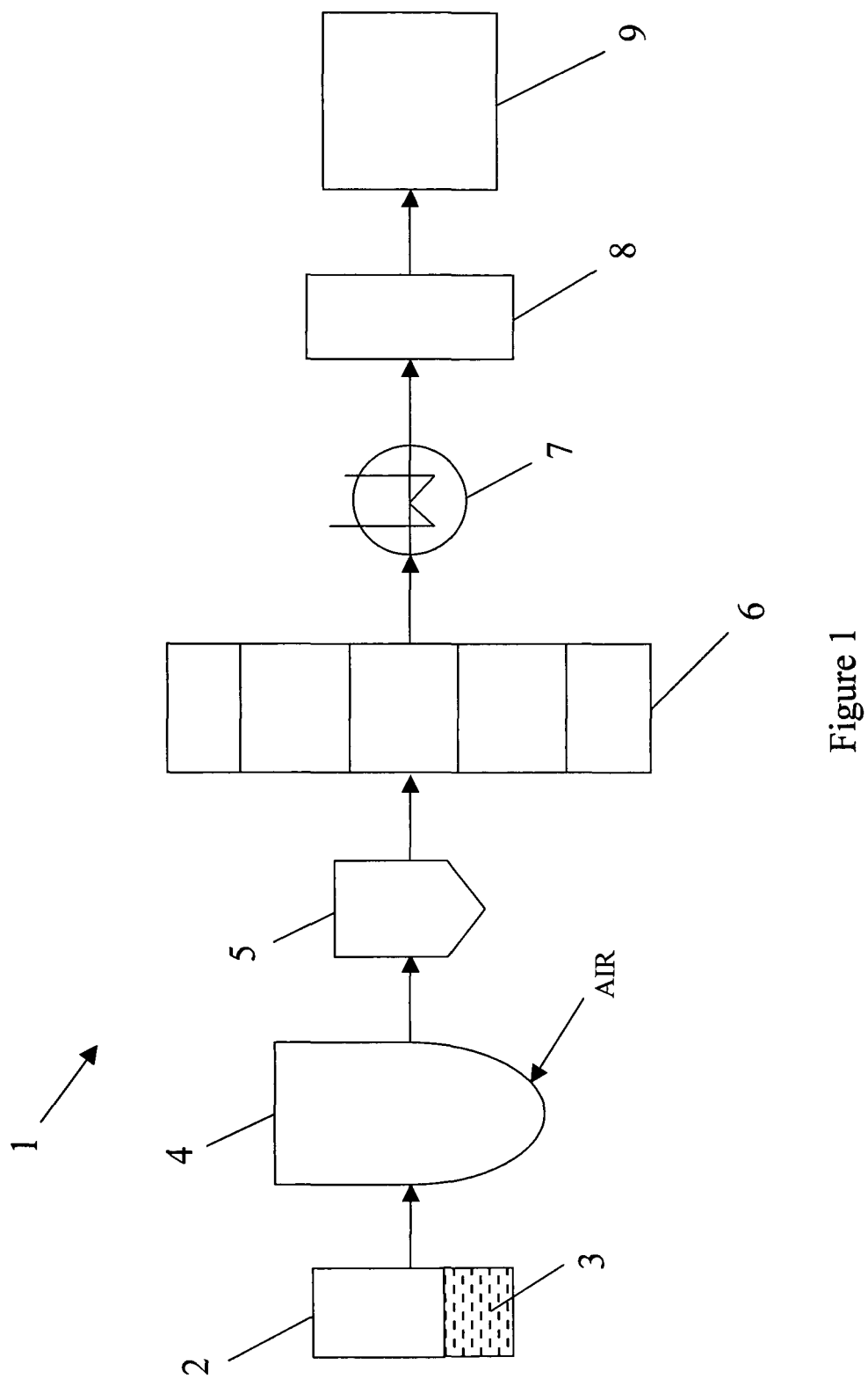
FIG. 1 is a schematic representation of a method and apparatus for processing animal manure according to the prior art.

European patent application publication no. WO95/35439 (BTG BV) discloses a method and apparatus for processing animal manure by drying and gasifying the manure followed by 'cracking' the gasified manure mixture to yield a combustible fuel gas which is then used to power a conventional combustion engine to generate power. A schematic representation of this process is shown in FIG. 1 which will now be described in more detail.

The BTG BV biomass processing apparatus 1 comprises a storage vessel 2 for raw chicken manure 3 in which the manure 3 is dried to a dry solid content of 85%. The dried chicken manure 3 is then fed to a fluid bed gasification unit 4 provided with a compressed air supply (temperature 293 K, pressure 1.013 bara) where the manure 3 is gasified and 'cracked' for three days at a temperature of 993 K.

Following gasification and cracking, the gasified mixture of combustible fuel gas and gasification by-products (ash, carbon monoxide, carbon dioxide, methane, hydrogen, nitrogen, water vapour, ammonia, hydrogen chloride, hydrogen sulphide and tar) is purified by passing through a rotating particle separator 5 where the majority of dust present is removed. The remaining by-products include tar and some residual ammonia which are removed in a thermocatalytic tar cracker 6 which operates at atmospheric pressure and a temperature of 1173 K to convert the residual ammonia into hydrogen and nitrogen.

The purified combustible fuel gas is then cooled to a temperature of 313 K using a cooling unit 7 which is a two-stage gas cooler employing air and then water to achieve the desired cooling effect. Cooling air which becomes heated in the cooling unit 7 is recycled and fed to the storage vessel 2 to assist in drying untreated manure 3. The combustible fuel gas is then retained in a gas storage vessel 8 for metering as desired to a combustion engine 9 to generate power.

This system was modelled using a mass and energy balance model based on ideal physical properties and thermodynamic principals to determine its ideal overall power generation efficiency. The process is modelled as if the fuel gas fed to the combustion engine has a temperature of around 1160 K and pressure of 10 bara.

The overall ideal power generation efficiency of the BTG process is 18%.

Comparative Example 2

International patent application no. WO95/35439 (Cratech, Inc.) discloses a gasification system for processing cotton gin trash to generate power. The process involves appropriate sizing of the cotton gin trash, passage of the reduced size raw material through a "lockhopper" where the pressure of the system is increased before feeding the raw material to a gasification unit to 'crack' the raw material and produce a combustible fuel gas.

Figure 2:
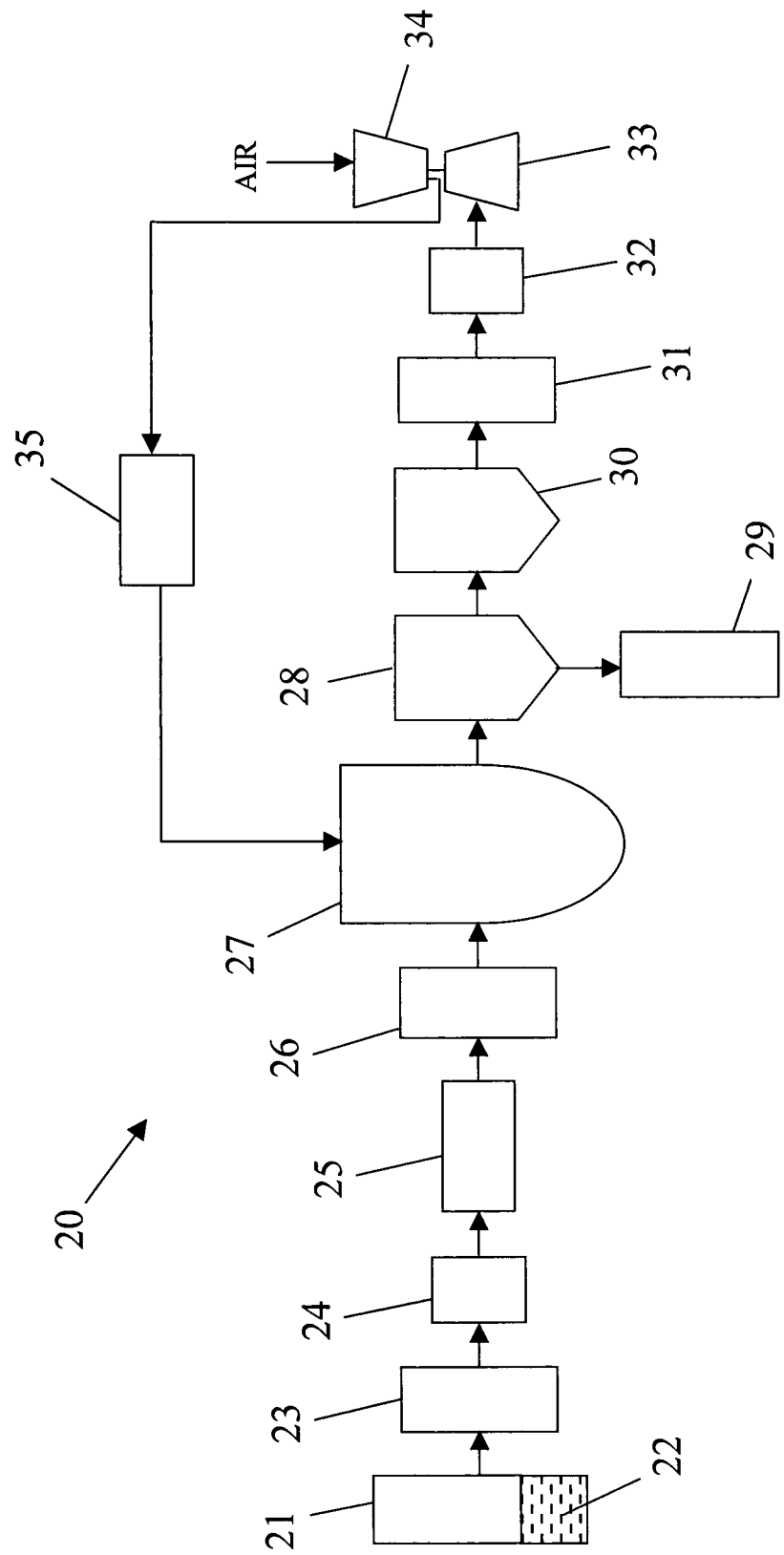
FIG. 2 is a schematic representation of a gasification system for processing cotton gin trash to generate power according to the prior art.

By-products of the gasification reaction are separated from the combustible fuel gas in cyclonic and mechanical filter units before the combustible gas is fed to a gas turbine unit for the production of energy. A schematic representation of this process is shown in FIG. 2 which will now be described in more detail below.

The Cratech, Inc. biomass processing apparatus 20 comprises a bulk storage vessel 21 for bulk cotton gin trash 22. A hammer mill 23 is provided at the exit of the storage vessel 21 which is used to reduce the size of the bulk raw material 22 so that it is suitable for gasification. The reduced size raw cotton gin trash is held in a material store 24 from which it is metered to a high pressure feed tank or "lockhopper" 25 (rated to around 20.7 bar) connected to a compressed air source. The pressure of the air/cotton gin trash mixture within the lockhopper 25 is taken to be around 6 bar. The mixture is then fed from the lockhopper 25 to a high pressure meter hopper 26.

The high-pressure air/cotton gin trash mixture is then metered as required to a fluid bed gasification unit 27 with a compressed air feed (temperature 487 K, pressure 6 bara) in which the cotton gin trash is gasified and cracked at a temperature of 873 to 1123 K to yield a combustible fuel gas together with similar by-products to those generated in the BTG BV process described in Comparative Example 1.

The combustible fuel gas/by-product mixture is then passed through two filters. The first filter is a rotating particle separator 28 from which ash is removed and fed to an ash store 29 for further use. The second filter is a mechanical filter 30 which includes sintered metal and a ceramic barrier to remove substantially all remaining solid particles. The purified combustible fuel gas is then passed to a gas storage vessel 31 prior to being metered as required to a burner 32 which is connected to a gas turbine comprising a turbine expander 33 and compressor 34 for the generation of power. Hot exhaust gases from the turbine expander 33 are exhausted in the usual way, however, a portion of compressed air from the compressor 34 is recirculated via a booster compressor 35 to the gasification unit 27 in an attempt to improve the overall power generation efficiency of the Cratech, Inc. process.

This system was modelled using a mass and energy balance model based on ideal physical properties and thermodynamic principals to determine its ideal overall power generation efficiency. The fuel gas exiting the burner is modelled as having a temperature of around 1175 K and a pressure of around 5.5 bara.

The overall ideal power generation efficiency of the Cratech, Inc. process is 32%.

Example 1

Figure 3:
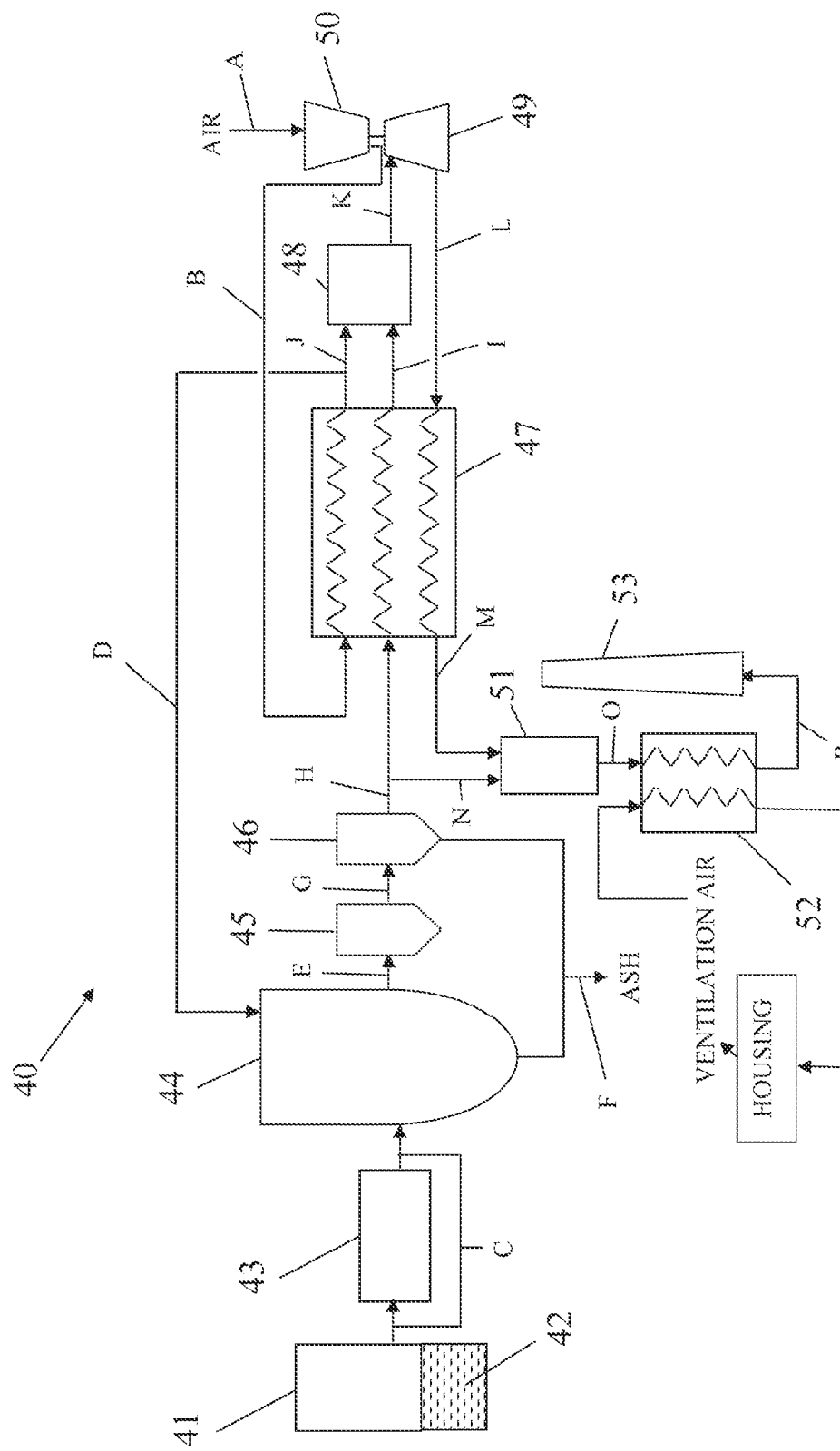
FIG. 3 is a schematic representation of a method and apparatus for processing biomass according to the present invention.

The present invention provides an improved method and apparatus for processing biomass, particularly but not limited to broiler chicken litter, which is particularly suitable for farm-scale implementation. A preferred embodiment of the method of the present invention employs gasification of a biomass/air mixture followed by filtering of the mixture prior to feeding to a burner/turbine for the generation of power. A schematic representation of the method/apparatus of the present invention is provided in FIG. 3 below.

The method of the present invention includes the integration of various steps of the overall process which contribute individually and collectively to improve the overall power generation efficiency of the inventive process compared to the BTG BV and Cratech, Inc. processes described in Comparative Examples 1 and 2 respectively. The process shown in FIG. 3 includes certain optional but preferable features of the process of the present invention which demonstrate how the apparatus of the present invention can be fully integrated with a farm-scale broiler chicken plant.

The present invention provides apparatus 40 which comprises a litter store 41 in which chicken litter 42 (comprised of cellulosic bedding material and chicken manure) is stored at ambient temperature and pressure.

The process begins with the chicken litter 42 being metered from the store 41 via a direct flow metering unit 43 to a gasifier 44 (Step C) where the litter 42 is mixed with high temperature pre-heated compressed air having a temperature of about 890 K and a pressure of around 5.75 bara to form a hot litter/air mixture with a temperature considerably higher than that achievable in either the BTG or Cratech processes and contributes towards the improved power generation efficiency of the process of the present invention compared to the BTG and Cratech prior art processes.

The pre-heated litter/air mixture is then fed to a gasification unit 44 where the temperature of the litter/air mixture is further raised to approximately 1023 K to gasify and crack the chicken litter 42 which produces a combustible fuel gas and the common by-products of the gasification process as described in detail in Comparative Example 1, such as carbon monoxide, carbon dioxide and ammonia. Surplus solids generated in the gasification process are discharged as ash.

The combustible fuel gas/by-product mixture exiting the gasification unit 44 which contains the combustible fuel gas still at a temperature of around 1023 K and pressure of about 5.75 bara is passed to a rotating particle separator 45 (Step E) to remove the bulk of the dust present and return it to the fluidised bed of the gasification unit 44. The fuel gas/by-product mixture is then fed through a high temperature gas filter 46 (Step G) to remove any residual dust.

The filtered combustible fuel gas exiting the high temperature filter 46 is at a temperature of around 1023 K and approximately 5.5 bara pressure and is fed through a heat interchanger 47 (Step H) before being fed to a burner unit 48 (Step I). The exhaust gases exiting the burner 48 (Step K) have a temperature of approximately 1475 K and a pressure of around 5.5 bara and are used to drive a gas turbine (which may optionally be connected to an alternator, not shown in FIG. 3) comprising a turbine expander 49 and compressor 50 for the generation of power.

A portion of the hot gases (temperature around 1020 K, pressure 1.5 bara) exiting the expander 49 is fed to the heat interchanger 47 (Step L) to retain as much useful heat energy as possible within the system.

Within the heat interchanger 47 the hot gases from the expander 49 (temperature 1020 K, pressure 1.5 bara) are brought into thermal contact with a portion of cooler compressed air (temperature 488 K, pressure 6 bara) which has been fed from the compressor 50 to the heat interchanger 47 (Step B). This raises the temperature of the portion of cooler air from the compressor to a temperature of around 890 K and pressure of 5.5 bara which is then fed to the burner 48 (Step J). Raising the temperature of the compressed air fed to the burner 48 significantly reduces the amount of additional heating required within the burner 48 to generate sufficiently hot exhaust gases to drive the turbine.

The warmed compressed air feed from the heat interchanger 47 to the burner 48 (Step J) is integrated with the gasification unit 44 to retain further useful heat energy within the system. A portion of warmed compressed air exiting the heat interchanger 47 is fed to the gasification unit 44 (Step D) to raise the temperature and/or pressure within the gasifier to assist in gasifying and cracking the litter/air mixture. This reduces the mass of litter within the gasifier that must be burned to generate sufficient thermal energy to drive the gasification/cracking process and thereby improves the overall power generation efficiency of the process.

Also within the heat interchanger 47 the hot gases from the expander 49 (temperature around 1018 K, pressure around 1.5 bara) are brought into thermal contact with the filtered combustible fuel gas (temperature around 1023 K, pressure approximately 5.5 bara) from the high temperature filter 46 as it passes through the heat interchanger 47. In the present exemplary embodiment, the temperatures of the hot gases from the expander 49 and the fuel gas are very similar and so heat transfer between these two gas streams is very low.

However, in alternative embodiments the process can be modified so that the temperature differential between these two gas streams is much greater such that an appreciable amount of heat energy is transferred between the gas streams, or so that the fuel gas stream is thermally insulated from the hot gases from the expander.

For example, in a first alternative exemplary embodiment the process described herein can be modified such that the temperature of the hot gases from the expander 49 is much greater than the temperature of the fuel gas to encourage the transfer of a relatively large amount of heat energy from the expander gases to the fuel gases. As will be appreciated, this will raise the temperature of the fuel gas fed to the burner 48, thereby reducing the amount of heating required in the burner.

In a second alternative exemplary embodiment, the process can be modified such that the fuel gas does not pass through the heat interchanger 47 but instead passes directly from the high temperature filter 46 to the burner 48. In this way, the fuel gas is thermally insulated from the expander gases. This may be advantageous where the temperature of the gases exiting the expander 49 is significantly lower than the temperature of the fuel gas passing from the filter 46 to the burner 49. A reduction in temperature of the fuel gas is likely to necessitate increased heating in the burner 48 and may, as a result, reduce the overall power generation efficiency of the process.

The exhaust gases exiting the heat interchanger 47 are then passed to a De-NO$_x$ filter 51 at a temperature of about 707 K and pressure of about 1.3 bara, which can be optimised for use with any particular De-NO$_x$ filter. A small portion of the dry combustible fuel gas exiting the hot gas filter 46 is fed to the De-NO$_x$ filter 51 to improve the efficiency of the catalytic De-NO$_x$ process.

The gases exiting the De-NO$_x$ filter 51 now contain nitrogen and carbon dioxide and are at a temperature of around 770 K and a pressure of about 1.2 bara. The purified hot exhaust gases are then passed through a second heat interchanger 52 to discharge the remaining useful energy in the exhaust gases to ventilation air before release of the cooled exhaust gases to the atmosphere via a vent 53.

The above described process according to an exemplary embodiment of an aspect of the present invention was modelled using a mass and energy balance model based on ideal physical properties and thermodynamic principals to determine its ideal overall power generation efficiency. As mentioned above, the exhaust gases exiting the burner 48 (Step K) are modelled as have a temperature of approximately 1475 K and a pressure of around 5.5 bara. It will be noted that the temperature of the fuel gases being fed from the burner to the power generator are significantly higher than those in the BTG and Cratech processes, which further contributes to the improvement in overall power generation efficiency of the process of the present invention compared to the two prior art processes.

The overall ideal power generation efficiency of the exemplary embodiment of the process of the present invention described in Example 1 is 44%.

The overall performance characteristics of the processes described in Comparative Examples 1 and 2, and Example 1 are set out below in Table 1. Ambient temperature was taken as 293 K in Comparative Examples 1 and 2, and in Example 1.

TABLE 1

|  | Comparative Example 1 | Comparative Example 2 | Example 1 |
| --- | --- | --- | --- |
| Enthalpy of air entering | 111 | 111 | 111 |
| Enthalpy of litter | −417 | −417 | −417 |
| Enthalpy of ash | 2.95 | 2.95 | 2.95 |
| Enthalpy of flue gas | −702 | −704 | −704 |
| Compression shaft input | 189 | 77 | 77 |
| Expansion shaft output | −260 | −204 | −249 |
| Overall ideal efficiency | 18% | 32% | 44% |

The invention claimed is:

1. A method for generating power from biomass comprising a gasification process involving:
    the gasification of biomass in the presence of compressed air to produce a combustible fuel gas in a gasifier; and
    a power generation process comprising a gas turbine, the gas turbine comprising a compressor and a turbine, the power generation process involving combustion of said combustible fuel gas to produce an exhaust gas, the exhaust gas being fed to the turbine;
    the method further comprising providing compressed air from the compressor to a heat exchanger, the heat exchanger in thermal contact with the exhaust gas from the turbine and feeding at least a portion of compressed air from the heat exchanger to the gasifier and feeding the combustible fuel gas to the heat exchanger prior to being fed to the gas turbine.

2. A method according to claim 1, wherein said portion of compressed air from the heat exchanger has a temperature of at least around 600 Kelvin.

3. A method according to claim 1, wherein said portion of compressed air from the heat exchanger has a pressure of at least around 4 bar.

4. A method according to claim 1, wherein the method further comprises using a further portion of compressed air from the heat exchanger to assist combustion of said combustible fuel gas.

5. A method according to claim 4, wherein said compressed air from the heat exchanger has a temperature of at least around 600 Kelvin.

6. A method according to claim 4, wherein said compressed air from the heat exchanger has a pressure of at least around 4 bar.

7. A method according to claim 1, wherein the compressed air introduced to said heat exchanger has a lower temperature than the exhaust gas to facilitate heat transfer from the exhaust gas to the compressed air.

8. A method according to claim 1, wherein the exhaust gas has a temperature of at least around 800 Kelvin.

9. A method according to claim 1, wherein the compressed air before being introduced to said heat exchanger has a temperature of less than around 600 Kelvin.

10. A method according to claim 1, further comprising providing combustible fuel gas to said heat exchanger, the heat exchanger in thermal contact with the exhaust gas from the turbine and feeding said combustible fuel gas from the heat exchanger to the turbine of said gas turbine.

* * * * *